O. A. BOYER.
ROTARY INTERNAL COMBUSTION ENGINE.
APPLICATION FILED FEB. 7, 1911.
1,025,117.
Patented May 7, 1912.
3 SHEETS—SHEET 1.
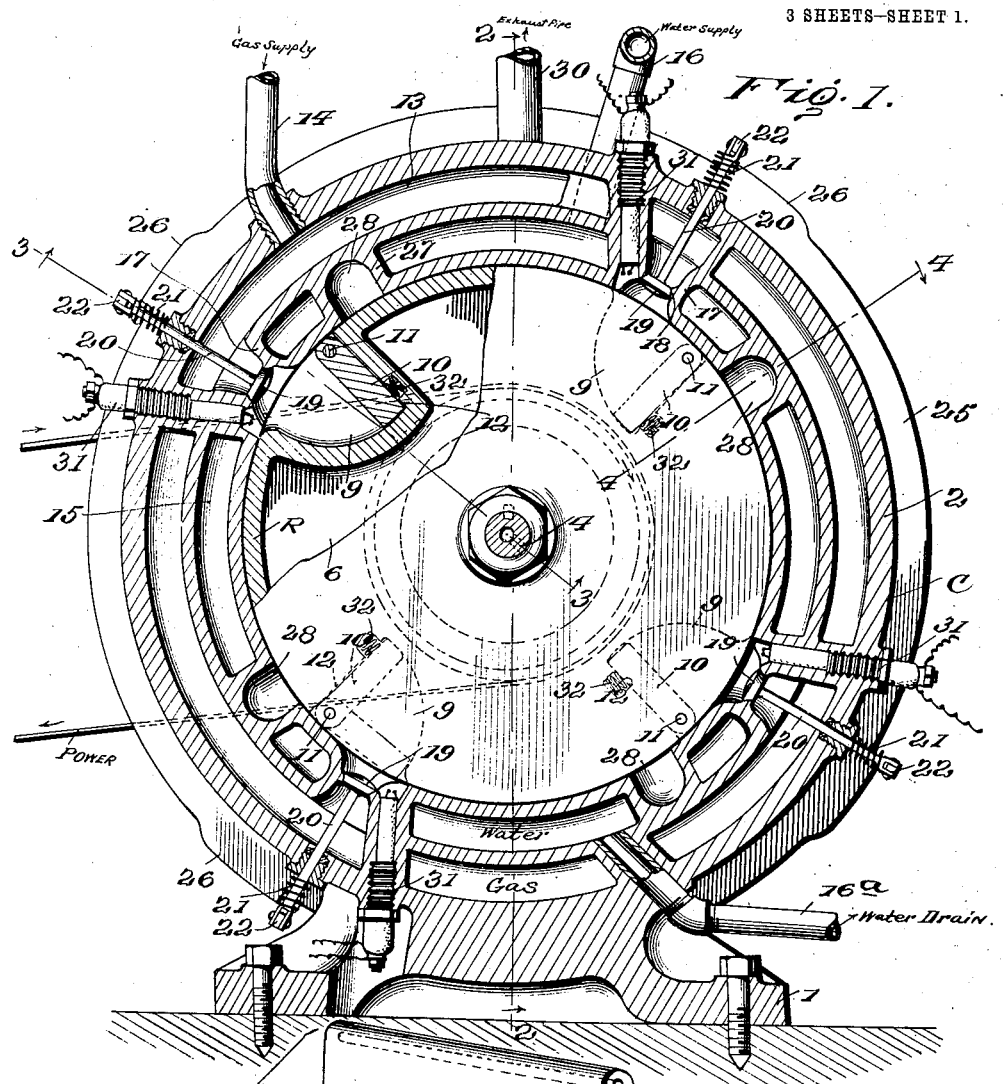
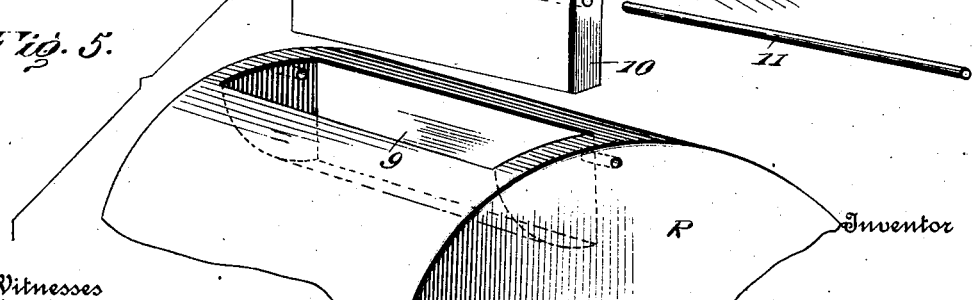
Witnesses
W. F. Hodson
G. G. Watt
Inventor
Oram A. Boyer.
By _____, Attorneys

O. A. BOYER.
ROTARY INTERNAL COMBUSTION ENGINE.
APPLICATION FILED FEB. 7, 1911.

1,025,117.

Patented May 7, 1912.

3 SHEETS—SHEET 2.

Witnesses

Inventor
Oram A. Boyer.

By
Attorneys

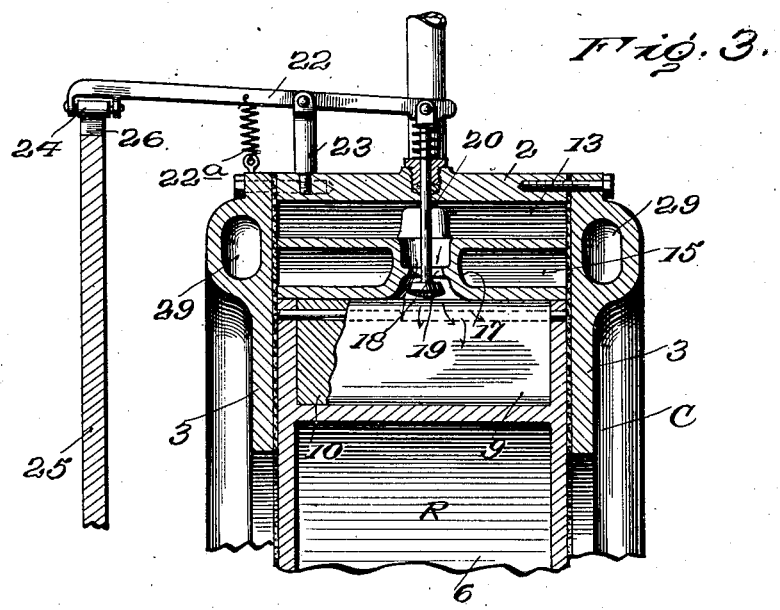
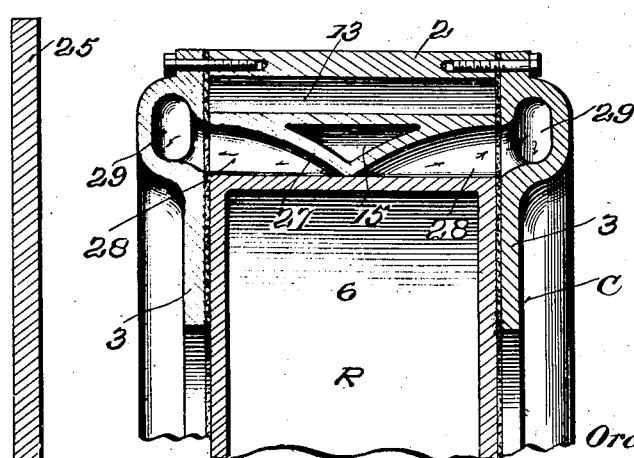

UNITED STATES PATENT OFFICE.

ORAM A. BOYER, OF MILWAUKEE, WISCONSIN.

ROTARY INTERNAL-COMBUSTION ENGINE.

1,025,117.   Specification of Letters Patent.   Patented May 7, 1912.

Application filed February 7, 1911. Serial No. 607,132.

*To all whom it may concern:*

Be it known that I, ORAM A. BOYER, citizen of the United States, residing at Milwaukee, in the county of Milwaukee and State of Wisconsin, have invented certain new and useful Improvements in Rotary Internal-Combustion Engines, of which the following is a specification.

This invention comprehends certain new and useful improvements in rotary internal combustion engines or turbines, and the invention has for its primary object a simple and efficient construction of device of this character embodying any desired number of swinging abutments, the parts being so arranged that in the rapid revolution of the rotor carrying the abutments, the latter will be swung out by centrifugal action toward the rim of the rotor to compress successive charges of gaseous fuel, the latter being then instantly ignited to react and tend to force the abutments inwardly in their pockets and the spent charges being almost instantly thereafter expelled, as soon as they have imposed their expansive action upon the abutments and through the abutments to the rotor to revolve the latter.

With this and other objects in view as will more fully appear as the description proceeds, the invention consists in certain constructions, arrangements and combinations of the parts that I shall hereinafter fully describe and claim.

Figure 2:
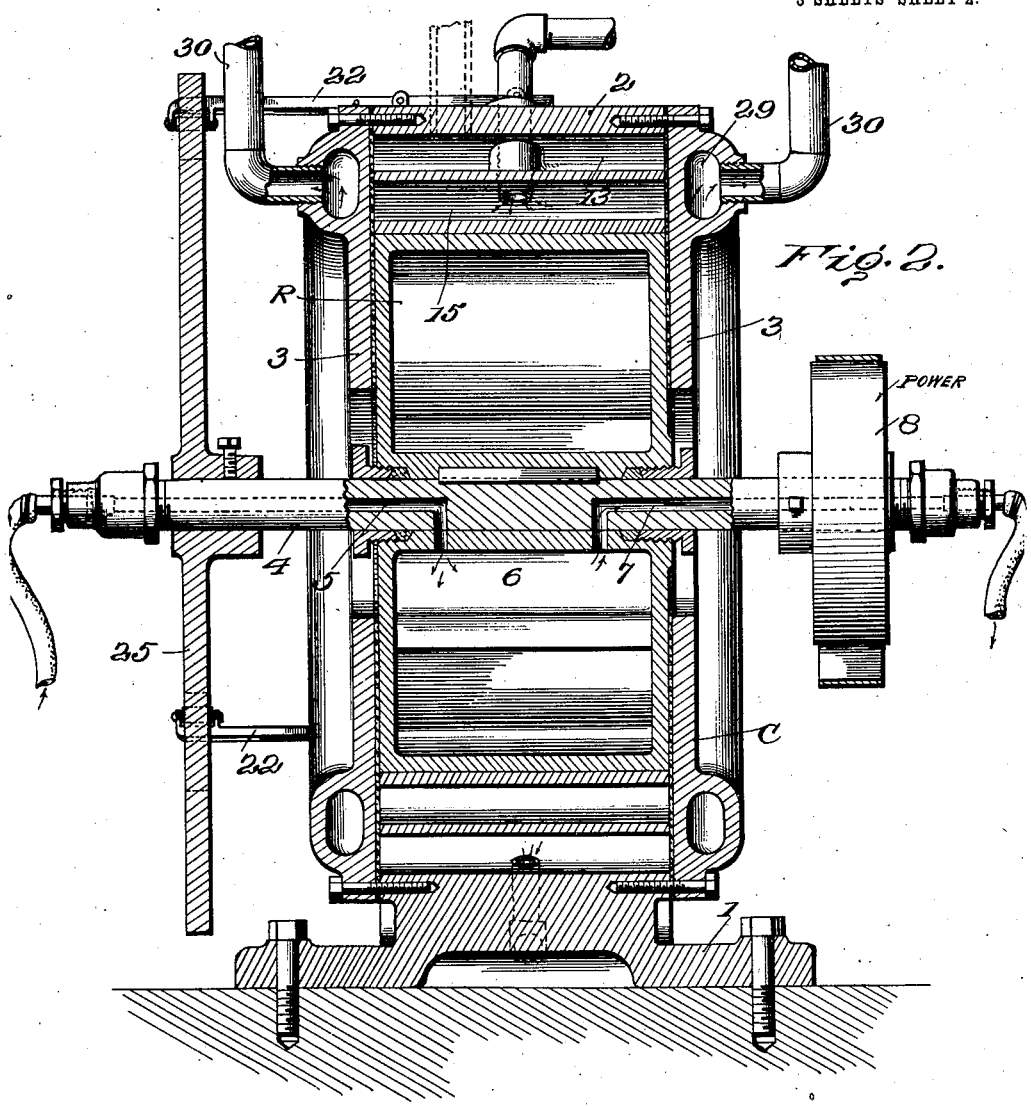
Figure 6:
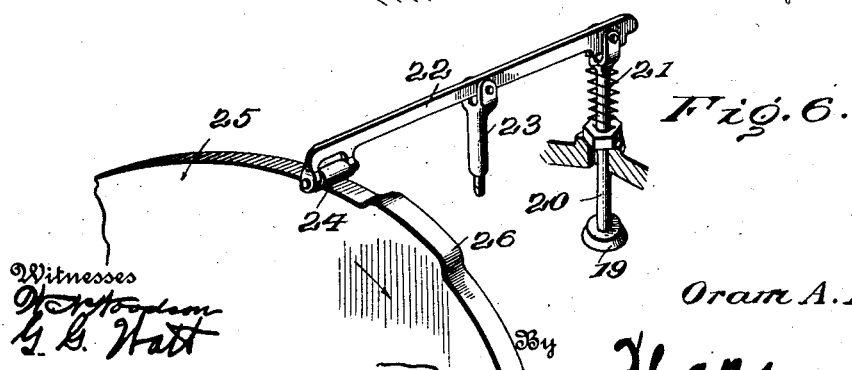

For a full understanding of the invention, reference is to be had to the following description and accompanying drawings, in which:

Figure 1 is a vertical longitudinal sectional view of my improved rotary internal combustion engine, parts being shown in side elevation and broken out to better illustrate the interior construction; Fig. 2 is a transverse sectional view thereof, the section being taken approximately on the line 2—2 of Fig. 1; Fig. 3 is a fragmentary sectional view on the line 3—3 of Fig. 1; Fig. 4 is a similar view on the line 4—4 of Fig. 1; Fig. 5 (Sheet 1) is a fragmentary perspective view of the rotor, one of the swinging abutments carried thereby and a spindle which may be used to pivotally mount the abutments in the rotor; and, Fig. 6 (Sheet 2) is a similar view of the cam wheel or disk and one of the levers designed to operate the intake valves.

Corresponding and like parts are referred to in the following description and indicated in all the views of the drawings by the same reference characters.

The casing C of my improved engine or turbine may embody any desired construction of base 1, a cylindrical body portion 2 and circular side plates or heads 3 bolted or otherwise secured to the body portion 2.

The rotor R is keyed or otherwise secured to the drive shaft 4, and said shaft is preferably provided with a water inlet passage 5 leading into the interior of the rotor which constitutes a water chamber 6 and with a separate and distinct water outlet passage 7 leading from said chamber, as best illustrated in Fig. 2. Power may be transmitted from the shaft 4 in any desired way, as by a pulley or band wheel 8 secured thereon. The rotor R is formed with any desired number of preferably transversely elongated rim opening pockets 9, there being four of these pockets in the present instance, arranged in equidistant relation to each other. Each of the pockets 9 accommodates a centrifugally acting freely swinging abutment 10 hinged at its outer edge, as indicated at 11 and adapted to be swung from a position against the relatively flat rear face 12 of the pocket around the curved wall of the pocket toward the rim of the rotor. It is to be particularly understood that the outwardly swinging movement of the abutments 10 is effected by centrifugal action solely and not by any mechanical accessories.

The casing C is provided with an annular gas chamber 13 into which the gaseous fuel may be admitted at any desired points in the periphery of the casing, (for instance, as at 14) said annular gas chamber surrounding an annular water chamber 15 which directly surrounds the rotor and into which water may be admitted and passed off through the intake and discharge passages 16—16ª.

At predetermined intervals, the number depending upon the number of abutments employed, the walls which define the water chamber 15 are formed, preferably midway of their side edges, with joining webs 17 apertured to produce gas intake ports 18 controlled by inwardly opening intake valves 19. Each of these valves is provided with a stem 20 pressed down in an outward direction by an expansion spring 21, and the stems are pivotally connected, respectively, at their outer ends to the inwardly projecting arms of laterally extending valve actuating levers 22. These levers are fulcrumed intermediate of their ends, as on radially projecting posts 23 secured to the body portion 2 of the casing C, their outwardly projecting arms are preferably connected to the adjoining head 3 of the casing by contractile springs 22ª, as best illustrated in Fig. 3, and said arms carry at their outer ends rollers 24 designed for engagement by cams formed on the periphery of a cam wheel or disk 25. This wheel is mounted on the shaft 4, as best illustrated in Fig. 3, and is formed with relatively short peripheral cams 26 arranged in equidistant relation to each other and of a number corresponding to the number of abutments and intake valves employed, that is, four in the present instance.

The walls which define the water chamber 15 are at predetermined intervals extended inwardly from both side edges toward the middle, as indicated at 27 in Fig. 4 to constitute oppositely extending side opening exhaust ports 28 arranged relatively close to the intake ports 18 and communicating at their outer ends with annular exhaust chambers 29 from which the spent gases may be discharged at any desired points, such as are indicated at 30 in Fig. 2.

31 designates spark plugs of any desired type, construction, or design, said plugs being preferably located very close to the intake ports 18 and preferably positioned with the intake ports interposed between the plugs and the adjoining exhaust ports.

In the practical operation of my improved turbine, the gaseous fuel is admitted to the gas chamber 13. The rotation of the cam wheel 25 operates the intake valves 19, which allows the gas to fill the space in the abutment pocket of the rotor. It is manifest that centrifugal force will swing the abutment out toward the rim of the rotor which will compress the gas and immediately the gas is ignited by the sparking device, the expansive action of the exploding gas forcing the abutment inwardly, downwardly and forwardly, the energy thereof being transmitted to or imposed upon the rotor. The spent gases will then instantly be discharged and the pocket recharged by the time it has reached the next inlet valve in the series.

While the accompanying drawings show what I believe to be the preferred embodiment of my invention, yet it is to be understood that the invention is not limited thereto, as various changes may be made in the construction, arrangement and proportions of the parts without departing from the scope of my invention as defined in the appended claims.

Preferably, the rotor R carries springs 32 designed to reduce the shock of the swinging abutments 10 on the rotor after the expansion.

Having thus described the invention, what is claimed as new is:

1. An engine of the character described, embodying a casing, a rotor mounted therein, the rotor being provided with a plurality of rim opening pockets, and the casing being formed with intake ports opening on the rim of the rotor and adapted to intermittently and successively communicate with said pockets, freely swinging abutments mounted in the respective pockets and arranged to be swung outwardly therein by centrifugal action from an inward substantially radial position toward the rim of the rotor, intake valves adapted to admit gaseous fuel into the pockets as they arrive at the intake ports controlled by said intake valves, means for operating said valves, and means for igniting the fuel admitted through said ports.

2. An engine of the character described, comprising a casing, a rotor mounted in said casing and provided with a plurality of rim opening abutment pockets, abutments mounted to freely swing in said pockets and arranged to be moved by centrifugal action from an inner relatively inoperative position toward the rim of the rotor, the casing being formed with a plurality of intake ports and provided with intake valves controlling said ports, the ports opening at the rim of the rotor, the casing being further provided with exhaust ports close to the intake ports and with igniting devices contiguous to the intake ports, and means for moving the intake valves toward the open position, the intake valves being located between the igniting devices and the adjoining exhaust ports.

3. An engine of the character described, comprising a casing formed with an annular gas chamber, the inner wall whereof is deflected and apertured to form intake ports, a rotor mounted in said casing and provided with a plurality of rim opening pockets, and freely swinging centrifugally acting abutments mounted in said pockets, intake valves controlling said ports, means for opening said valves to admit charges from the gas chamber into the pockets as they arrive at the intake valves in the revolution of the rotor, means for igniting the charges, and means for discharging the spent gases.

4. An engine of the character described, comprising a casing formed with an annular gas chamber, a separate water chamber surrounded by the gas chamber, a rotor mounted in the casing and surrounded directly by the annular water chamber, the inner wall of the gas chamber being deflected and apertured to form intake ports, intake valves controlling said ports, a rotor mounted in said casing and formed with a plurality of rim opening pockets, freely swinging and centrifugal acting abutments mounted in said pockets, intake valves controlling said ports, means for opening said valves, means for igniting the charges admitted by said valves into the pockets, the walls of the water chamber being deflected inwardly from opposite sides to produce laterally opening and oppositely extending exhaust ports adapted to receive the gases immediately after they have been exploded, and the casing being formed with opposite annular exhaust chambers communicating at intervals with said exhaust ports.

In testimony whereof, I affix my signature in presence of two witnesses.

ORAM A. BOYER. [L. S.]

Witnesses:
ALBERT B. CLARKE,
COE E. FISHER.